United States Patent
Stein et al.

[11] 3,841,790
[45] Oct. 15, 1974

[54] COMPRESSOR FLOW FENCE

[75] Inventors: Wolfgang J. Stein, Milford; Salvatore Straniti, Orange, both of Conn.

[73] Assignee: Avco Corporation, Stratford, Conn.

[22] Filed: Nov. 19, 1973

[21] Appl. No.: 417,101

[52] U.S. Cl. .............................. 415/159, 415/147
[51] Int. Cl. ....... F02d 9/14, F02d 7/04, F01d 17/14
[58] Field of Search .......... 415/159, 160, 166, 156, 415/146, 147; 137/15.1, 15.2

[56] References Cited
UNITED STATES PATENTS

| | | | |
|---|---|---|---|
| 2,838,227 | 6/1958 | Thomas et al. | 415/147 |
| 3,662,556 | 5/1972 | Poucher et al. | 137/15.1 |

FOREIGN PATENTS OR APPLICATIONS

| | | | |
|---|---|---|---|
| 957,884 | 5/1964 | Great Britain | 415/147 |

*Primary Examiner*—William L. Freeh
*Assistant Examiner*—Louis J. Casaregola
*Attorney, Agent, or Firm*—Charles M. Hogan; Irwin P. Garfinkle

[57] ABSTRACT

A pair of split overlapping rings are received in an annular compressor inlet and have free ends displaceable relative to one another to vary the inner diameter of the rings and prevent compressor surge. A series of links connected to the free ends of the split rings are guided for movement through a predetermined path. Additionally, the midpoint of the split rings is guided for radial movement only so that the inner diameter of the split rings remains substantially concentric between their fully expanded and fully contracted positions. A control system senses various engine parameters and modulates the opening of the rings to achieve optimum engine performance while preventing compressor surge.

16 Claims, 5 Drawing Figures

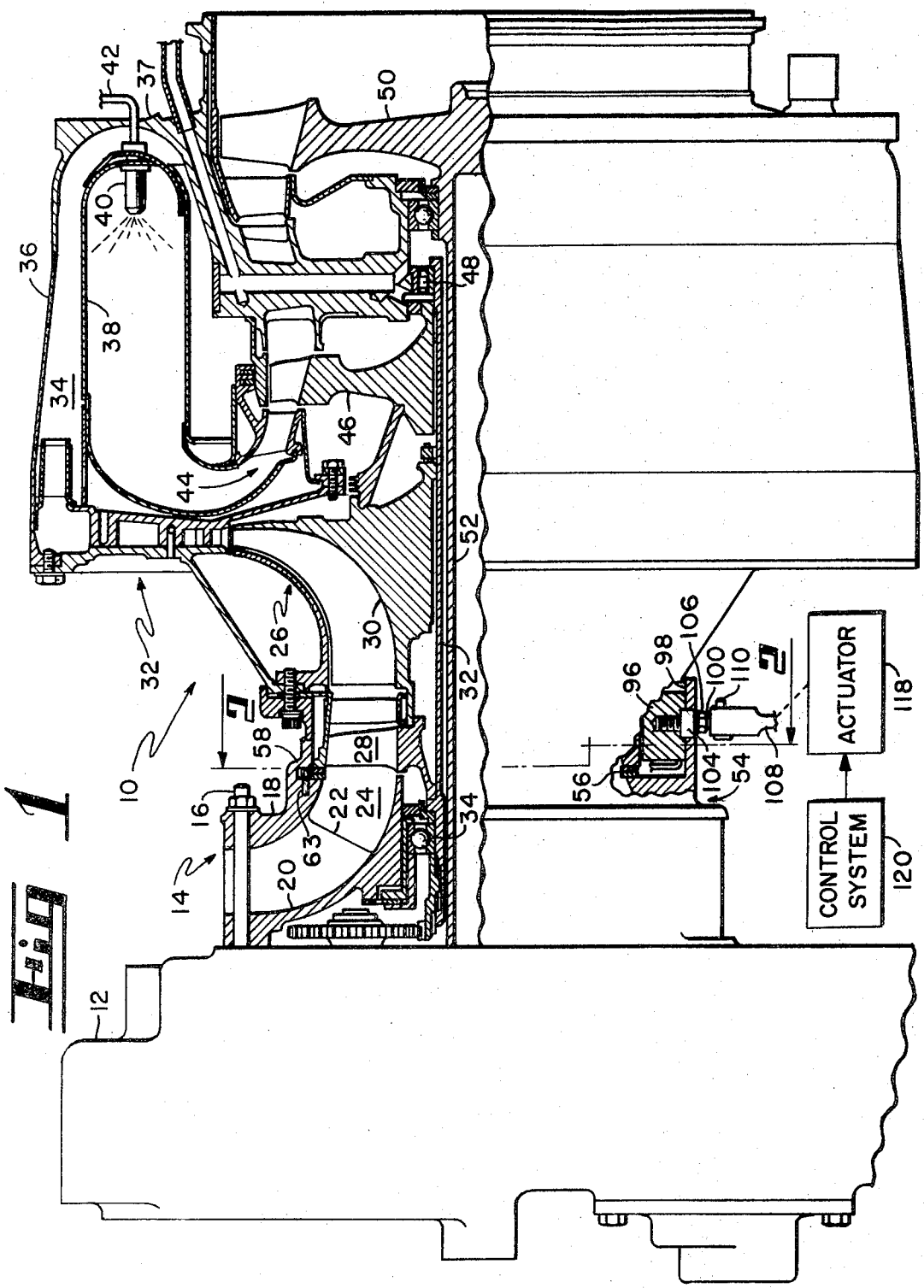

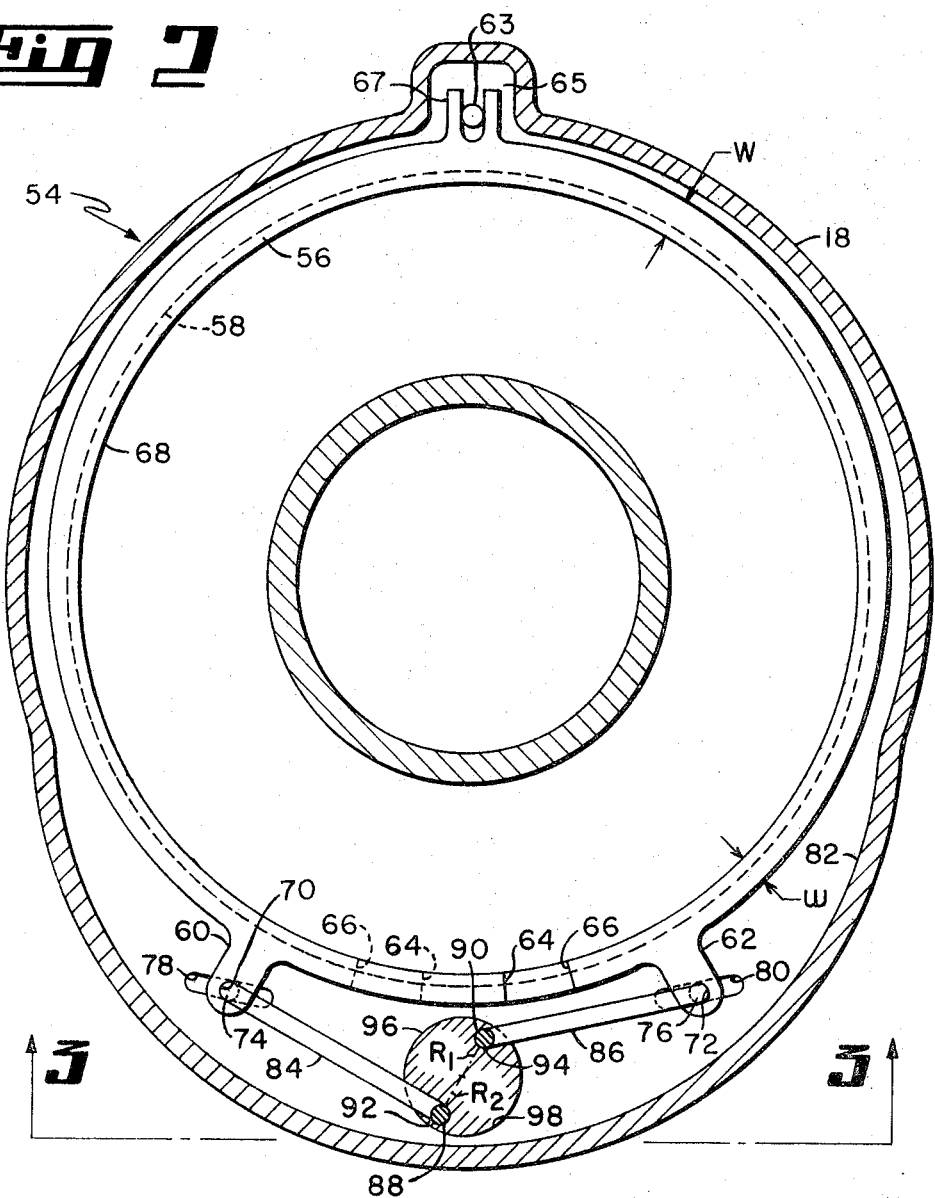
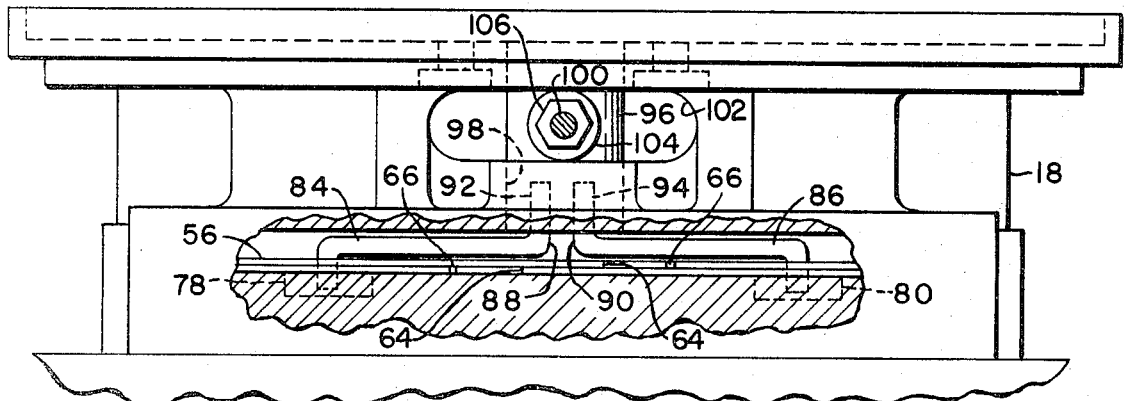

COMPRESSOR FLOW FENCE

The present invention relates to gas turbine engine compressors and more particularly to devices for controlling compressor surge.

In recent years what is known as a flow fence has been incorporated in a gas turbine engine to prevent compressor surge. Briefly, this flow fence consists of a split ring received in an annular recess in the compressor inlet housing of a gas turbine engine. The ring has free ends which are displaceable relative to one another between a fully expanded and fully contracted position. In the fully expanded position the ring offers no resistance to flow into the compressor. In the fully contracted position they block flow into the compressor and more particularly to the tips of the compressor blades, thereby preventing compressor surge during certain operating conditions.

A ring of this type usually is actuated by a control system which senses particular engine parameters whose magnitude would indicate proximity to a surge condition and uses these parameters to control the ring between these two positions. This is effective in simply and efficiently eliminating stall.

One of the problems with this device, however, is that it is either on or off. The sudden change in the flow path through the compressor causes power surges that may be annoying to an operator. It is desirable then to slowly modulate the opening of the split ring to ease the transition and prevent noticeable surge. However, with prior art split rings it is not possible to maintain the inner diameter of the split ring concentric with the flow passage except at the fully contracted or fully expanded positions.

These problems are overcome by a flow control system for the annular inlet housing of a compressor which comprises at least one split ring received in circumferential recess in the housing. The ring has adjacent free ends and a reference diameter. Means are connected between the housing and points adjacent each of the free ends of the ring for displacing the free ends relative to one another through a predetermined path to vary the reference diameter of the ring. A guide means connected between the housing and the ring at a point midway between the points on the ring prevents circumferential movement but permits radial movement so that the reference diameter of the ring is maintained substantially concentric relative to the inlet housing irrespective of the variation in the reference diameter of the ring.

The above and other related features of the present invention will be apparent from a reading of the following description of the disclosure shown in the accompanying drawings and the novelty thereof pointed out in the appended claims.

In the drawings:

FIG. 1 is a simplified longitudinal section view of a gas turbine engine which incorporates a flow control system embodying the present invention;

FIG. 2 is a cross-sectional view of the flow control system of FIG. 1, taken on line 2—2 of FIG. 1;

FIG. 3 is an end view of a portion of the actuation system for the flow control system of FIGS. 1 and 2, taken on line 3—3 of FIG. 2;

Figure 4:
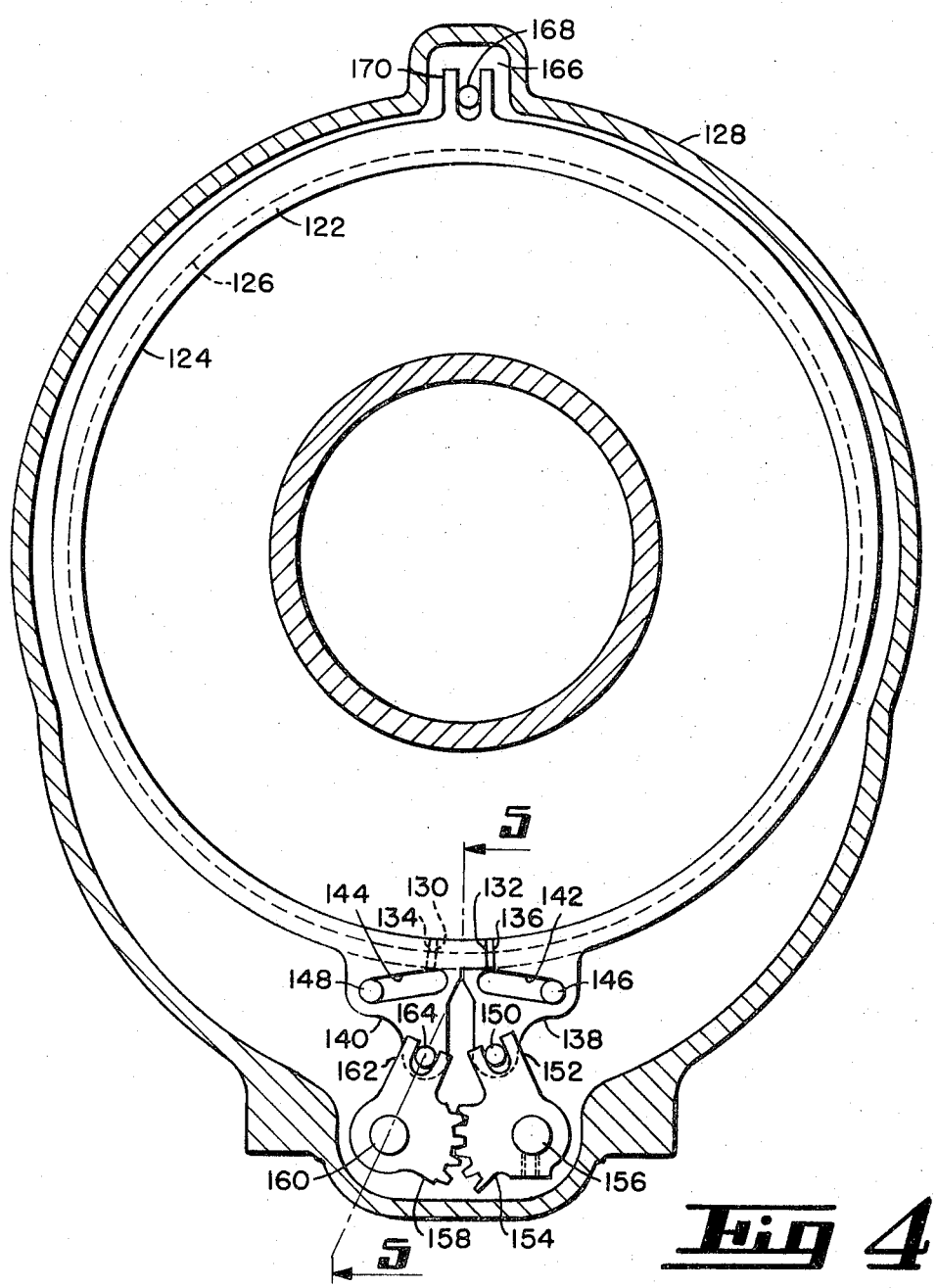
FIG. 4 is a cross-sectional view of a flow control system which utilizes a different embodiment of the present invention.

FIG. 1 shows a gas turbine engine 10 comprising a compressor inlet housing 14 secured to output gearbox 12 by bolt assemblies 16. Compressor inlet housing 14 has an outer annular housing 18 and inner annular housing 20 interconnected by struts 22 to form an annular inlet flow path 24 for a compressor assembly, generally indicated at 26.

Compressor 26 includes a rotatable bladed axial stage 28 and centrifugal impeller 30, both secured to a shaft 32 journaled at its forward end by bearing assembly 34 which is secured to housing 20. Rotation of the axial and centrifugal stages accelerates and pressurizes the air for discharge into a diffuser assembly 32 for increase in its static pressure. From there the air enters an annular chamber 34 defined by an outer housing 36 and cast annular rear strut assembly 37. An annular perforated combustor 38 is positioned within chamber 34 to receive the pressurized air and has nozzles 40 which injects fuel into the combustor 38 from a suitable source via conduit 42. The fuel/air mixture is ignited by a suitable device to produce a hot gas stream for discharge through a turbine inlet nozzle 44 across an axial-flow compressor turbine assembly 46, also mounted over shaft 32 and journaled by bearing assembly 48 that is mounted to the rear strut assembly 37. The hot gas stream passes from the compressor turbine 46 and across an axial-flow power turbine assembly 50 that is mounted on a power turbine shaft 52 extending forward to a suitable speed reduction gear set (not shown) in the gearbox 12.

During operation of the engine there are certain operating conditions during which compressor surge may be encountered. In accordance with the present invention a flow control system 54 is incorporated in the compressor inlet 24 to eliminate this condition.

As shown particularly in FIGS. 2 and 3, the flow control system 54 comprises a pair of back-to-back split rings 56 received in a circumferential groove 58 formed in the outer inlet housing 18. These split rings each have tabs 60 and 62 adjacent their free ends 64 and 66, respectively. As is particularly apparent in FIG. 2, the back-to-back rings have unequal lengths between the tabs 60, 62 and free ends 64, 66, respectively. This permits overlapping of the rings to prevent a gap in the flow path defined by the circular inner diameter 68 of the rings 56. For manufacturing purposes the back-to-back rings 56 are identical to one another and simply reversed so that the free ends 64 overlap one another, as particularly shown in FIG. 3.

A pin 63 is received in a recess 65 extending outward from groove 58 at a point which is midway around the ring 56 between the tabs 60 and 62. Tabs 67 extend radially outward from the ring 56 on either side of pin 63 so that it acts as a guide permitting radial movement of the ring 56 but not circumferential movement.

Tabs 60 and 62 have holes 70 and 72 receiving pins 74 and 76, respectively. These pins extend into slots 78 and 80 formed in the outer housing 18 in an arcuate recess 82 extending outward from circumferential groove 58. Pins 74 and 76 are respectively integral with links 84 and 86 at right angles to these pins. Links 84 and 86 have pins 88 and 90 at their opposite ends that are received in holes 92 and 94 of a cylindrical actuating element 96.

Actuating element 96 is journaled in a cylindrical bore 98 in outer housing 18 for rotation about an axis parallel to the central axis of the split ring. Actuating element 96 has a radial arm 100 threaded into it and extending through an elongated slot 102 around a portion of the circumference of outer housing 18. A relatively thick washer 104 is secured on arm 100 by a nut 106 and has an outer diameter close to the width of the slot 102 to axially position cylindrical element 96. A forked actuating link 108 is pivotally secured to arm 100 through a pin 110.

The actuating link 108 is mechanically connected to a suitable actuator 118 receiving control inputs from a control system 120 for pivoting the cylindrical element 96 in response to selected control signals as described later.

Figure 5:
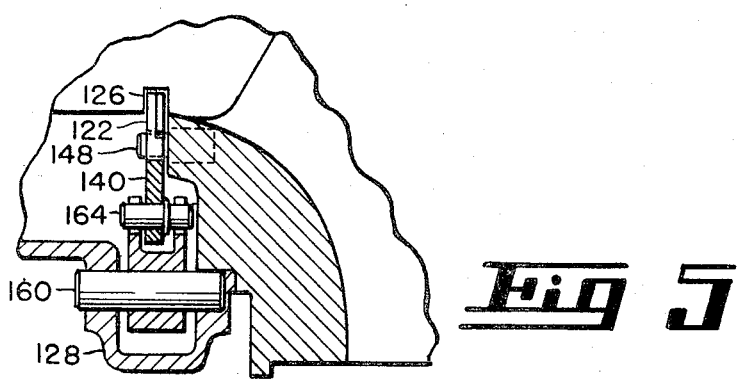
FIG. 5 is a fragmentary section view of the flow control system of FIG. 4, taken on line 5—5 of FIG. 4.

An alternate embodiment of the flow control system of FIGS. 1-3 is shown in FIGS. 4 and 5. This system comprises a split ring 122 having a generally circular inner diameter 124 and received in a circumferential groove 126 formed on the interior wall of an outer annular housing 128. In this embodiment the ring 122 has free ends 130 and 132 which overlap one another by providing opposed interfitting shoulders 134 and 136. The free ends of the ring 122 contain tabs 138 and 140 extending radially outward. Tabs 138 and 140 have slots 142 and 144 which receive guide pins 146 and 148, respectively. As pointed out later, the slots 142 and 144 guide movement of the free ends of the ring 122 through a predetermined path.

Tab 138 has a pin 150 adjacent its outer end which is received in a forked arm 152 integral with a sector gear 154. Sector gear 154 is mounted on a shaft 156 receiving a suitable rotary input from a controlled actuator (not shown). Sector gear 154 meshes with a corresponding sector gear 158 journaled on a shaft 160 and having a forked arm 162 receiving pin 164 that is secured to the outer end of tab 140.

Circumferential groove 126 has a recess 166 and a pin 168 positioned at a point midway between the tabs 138 and 140. Radial tabs 170 extend outward on either side of guide pin 168 so that the ring 122 is permitted to move only in a radial direction.

In operation the engine 10 goes through variations in compressor pressure and rpm. The control system 120 senses these conditions, as is well known in the art, and when it is necessary to vary the inner diameter 68 of the ring 56 sends a signal to actuator 118 which pivots actuating element 96. As shown in FIG. 2, rotation of element 96 in a counterclockwise direction contracts the split ring 56 and rotation in a clockwise direction expands it, thus varying the inner diameter 68 of ring 56 to form a variable area compressor inlet. The grooves 78 and 80 guide the displacement of the free ends of the rings 56 relative to one another through a predetermined path which insures that the center of the inner diameter 68 of ring 56 is substantially coaxial with the center of the annular housing 18. The guide pin 63 permits movement of the ring in a radial direction only so as to maintain in combination with the grooves 78 and 80 the desired concentricity irrespective of variations in the inner diameter of ring 56.

The width W of the ring 56 is a maximum at its midpoint tapering to a minimum width w at its free ends. This insures that the natural shape of the inner diameter 68 of ring 56 remains circular as the ends are being displaced relative to one another. If the ring were of uniform width there would be a tendency for a greater bending adjacent the midpoint of the ring and thus distort the desired circular shape.

The radius R1 of the hole 94 is somewhat less than the radius R2 for hole 92 relative to the center of actuating element 96. This is done to compensate for the fact that hole 94 is closer to the effective center of ring 56 than is hole 92. The difference in the radius causes the holes to move uniformly relative to the center of ring 56 for a given rotation of element 96.

The operation of the flow control system of FIGS. 4 and 5 is similar. The rotation of shaft 156 pivots the sector gears 154 and 158 for unified synchronized movement. This in turn displaces the free ends of the ring 122 relative to one another to cary the inner diameter 124 of ring 122. The pins 146 and 148 in cooperation with pin 168 insure that the effective center of the inner diameter 124 is coaxial with the center of housing 128 for all variations in the inner diameter of ring 122. This ring also has a maximum width adjacent the midsection tapering to a minimum width adjacent its ends.

The predetermined path through which the free ends of the split rings in both versions is determined by plotting a locus of points for the free end positions which causes the center of the inner diameter of the ring to be coaxial with that for the annular housing. This is possible because the guide pin near the midpoint fixes the ring in a radial plane. The displacement of the free ends relative to one another define the expansion or contraction of the free ends giving a particular inner diameter, while their distance from the center of the housing establishes the radius which must be made equal to the radius of the midpoint of ring 56 or ring 122 to the center of the housing. This is easily done and once the locus of points is established the slots are formed either in the housing or in the tabs to guide the movement of the free ends through this particular path.

While several preferred embodiments of the present invention have been described, it should be apparent to those skilled in the art that additional modifications may be employed without departing from its spirit and scope.

Having described the invention, what is claimed as novel and desired to be secured by Letters Patent of the United States is:

1. A flow control system for the annular inlet housing of a compressor, said system comprising:
   at least one split ring received in a circumferential recess in said housing, said ring having adjacent free ends and a circular reference diameter;
   means connected between said housing and actuation points adjacent each of the free ends of said ring for displacing said free ends toward and away from one another through a predetermined path thereby varying the reference diameter of said ring; and
   guide means connected between said housing and said ring at a point midway between the actuation points on said rings, said guide means preventing circumferential movement and permitting radial movement whereby the reference diameter of said ring is maintained substantially concentric relative to said inlet housing irrespective of the variation in said reference diameter.

2. A flow control system as in claim 1 wherein said displacing means comprises means for guiding the actuation points of said ring through said predetermined path so that the displacement of said actuation points relative to one another defines the magnitude of said reference diameter and the displacement of said actuation points relative to the center of said housing defines the concentricity of said ring.

3. A flow control system as in claim 2 wherein said displacement means comprises links having right angle output pins at one end and wherein said housing has arcuate slots receiving said output pins for guiding the actuation points through said predetermined path.

4. A flow control system as in claim 3 wherein:
the actuation points on said ring comprise tabs adjacent its free ends, said tabs having holes therethrough;
said pins extend through said holes and into said slots.

5. A flow control system as in claim 4 wherein said displacing means comprises:
input pins extending at right angles to said links at the other end of said links;
a generally cylindrical element journaled for rotation in said housing about an axis and having a pair of holes eccentric with respect to said axis, said input pins being received in said eccentric holes;
an arm extending radially from said cylindrical element to the exterior of said housing whereby pivoting of said arm rotates said cylindrical element and displaces the free ends of said ring relative to one another.

6. A flow control system as in claim 5 wherein said cylindrical element is journaled in a cylindrical bore in said housing, said housing having a slot extending through a portion of the circumference of said cylindrical bore and wherein said system further comprises a relatively thick sleeve telescoped over said radial arm, said sleeve having a diameter relative to the width of said slot that maintains the axial position of said cylindrical element.

7. A flow control system as in claim 1 wherein said guide means comprises:
a guide pin fixed to said housing at a point midway between the points of said rings; and
a forked element extending from said ring on both sides of said pin whereby said pin forms a guide for radial movement only of said ring.

8. A flow control system as in claim 1 having a pair of split rings, each displaced by said displacing means and guided for movement by said guide means, each of said rings having the distance between one of the free ends and the respective actuating point greater than that for the other free end so that the free ends of said rings overlap one another.

9. A flow control system as in claim 8 comprising a pair of identical rings each having the same relationship between their free ends and said actuating points, said rings being positioned against one another so that the free ends having the larger of the said distances overlap one another.

10. A flow control system as in claim 1 wherein said ring has a radial width which is a maximum at its midpoint and tapers to a minimum at its free ends.

11. A flow control system as in claim 1 wherein said circumferential recess is inward facing and said reference diameter is the inner diameter of said split ring.

12. A flow control system as in claim 1 wherein said displacing means comprises:
a pair of tabs extending radially from said ring at said actuation points; and
a pair of sector gears meshing with one another and each having radial arms connected to said tabs so that rotation of one sector gear rotates both for uniform displacement of free ends of said ring relative to one another.

13. A flow control system as in claim 12 wherein said tabs have pins extending therefrom and said sector gears have forked sections at the ends of said arms, said forked sections being received around said pins.

14. A flow control system as in claim 13 further comprising pins fixed in said housing adjacent the free ends of said ring, said tabs having slots therein for guiding the free ends of said ring through said predetermined path.

15. A flow control system as in claim 14 wherein said guide means comprises a pin fixed to said housing at a point midway between said tabs and a forked extension extending radially from said ring and received around said pin for permitting radial movement only of said ring.

16. A flow control system as in claim 15 wherein said ring has overlapping free ends.

* * * * *